United States Patent

Söderlund et al.

[11] Patent Number: 5,924,347
[45] Date of Patent: Jul. 20, 1999

[54] SPLITTING APPARATUS FOR SPLITTING COILS OF METAL SUCH AS STEEL AND ALUMINUM AND COILS OF OTHER MATERIALS INTO STRIPS

[75] Inventors: Stig Söderlund, Kopparberg; Jan Rönngren, Burttjärnsväger 6, both of Sweden

[73] Assignee: AKV-Ortic AB, Kopparberg, Sweden

[21] Appl. No.: 08/890,860

[22] Filed: Jul. 10, 1997

[30] Foreign Application Priority Data

Jan. 12, 1996 [SE] Sweden ................................. 9600098
May 13, 1996 [SE] Sweden ................................. 9601839
Jan. 9, 1997 [EP] European Pat. Off. ............. 97850001

[51] Int. Cl.⁶ ............................. B23D 19/06; B23D 35/00
[52] U.S. Cl. .............................. 83/425.4; 83/74; 83/481; 83/503; 83/698.41
[58] Field of Search ................... 83/72, 74, 425.2, 83/425.3, 425.4, 481, 343, 344, 345, 500, 503, 508.3, 698.41

[56] References Cited

U.S. PATENT DOCUMENTS

| | | |
|---|---|---|
| 4,116,098 | 9/1978 | Suzuki et al. ........................... 83/425.4 |
| 4,183,273 | 1/1980 | Greinke et al. . |
| 4,226,151 | 10/1980 | Littley et al. ........................ 83/425.4 X |
| 4,266,112 | 5/1981 | Niedermeyer ............................ 83/53 X |
| 4,667,550 | 5/1987 | Eitling .......................................... 83/56 |
| 4,684,360 | 8/1987 | Tokuno et al. ..................... 83/425.4 X |
| 4,757,732 | 7/1988 | Arima ................................. 83/425.3 X |
| 4,885,964 | 12/1989 | Neilsen et al. ..................... 83/425.3 X |
| 4,887,502 | 12/1989 | Voges .................................. 83/425.4 X |
| 4,922,779 | 5/1990 | Fritz et al. ................................ 83/503 |
| 5,074,180 | 12/1991 | Mayer et al. ..................... 83/698.42 X |
| 5,158,002 | 10/1992 | Matsunaga et al. ....................... 83/479 |

FOREIGN PATENT DOCUMENTS 0444047  9/1991  European Pat. Off. .

*Primary Examiner*—Rinaldi I. Rada
*Assistant Examiner*—T. Anthony Vaughn
*Attorney, Agent, or Firm*—Nils H. Ljungman and Associates

[57] ABSTRACT

The invention relates to a cutter assembly for slitting of coils of relatively large width into one coil of desired width or into several coils. The material for slitting is preferably metal, for example steel or aluminum, but coils of other material can also be slit. The invention is directed to make a very strong and stable slitting device, having a minimum of plays in order be able to slit steel coils from a thickness of up to 15 mm. The invention is also designed to slit coils of aluminum having a thickness of at least 0.1 mm.

19 Claims, 3 Drawing Sheets

SPLITTING APPARATUS FOR SPLITTING COILS OF METAL SUCH AS STEEL AND ALUMINUM AND COILS OF OTHER MATERIALS INTO STRIPS

BACKGROUND OF THE INVENTION

1. Field of the Invention

This invention relates to a cutter assembly or cutter assembling means for slitting of material coils or strips of relatively large width to either one strip of desired width or to several strips.

2. Background Information

The strip for slitting is preferably made of metal, for example steel or aluminum, but strips of other material can be used. The invention is useful for strong and thick material but can also be used for weak and soft material.

Slitting of coils of large width to one or several coils of desired width, often in connection with edge cutting, is favorably performed in a cutter assembling means. Such means are described for instance in U.S. Pat. No. 4,183,273 and European Patent No. 0 444 047 B1. The strip is directed in between two arbors equipped with dish or disc shaped cutters and spacers. The arbors are mutually parallel disposed above each other and joined in bearings to two frame portions. In other words, the two arbors are disposed mutually parallel to one another and are positioned one above the other. In one end of the slitter is a driving means for rotating the arbors.

OBJECT OF THE INVENTION

It is preferable to be able to have the other end of the arbors free. In this way it will be very easy reassembling and assembling the cutters and spacers when changing the material for slitting and/or changing the width of the desired strips. The sets of cutters and spacers are, when reassembled, pushed over to other arbors, and then docked to the ends of the arbors on the slitter. In the same way new sets of cutters and spacers are pushed over to the arbors of the slitter.

SUMMARY OF THE INVENTION

The present invention teaches that, to free the ends of the arbors, one of the frame portions is disposed to revolve sideways around a vertical shaft. But this assembly is often too weak. When slitting there will sometimes be forces that are not directed in an imaginary plane through the longitudinal center lines of the two arbors. These forces will tilt the movable frame portion. The slitting operation will therefore not be sufficiently good.

In other words, one portion of the frame can be disposed in a rotatable manner, substantially transverse to a vertical shaft. In this configuration, it is possible that forces generated during the slitting process will tilt the movable frame position away from the desired position, resulting in a product that is not within acceptable tolerances.

Sets of cutters and spacers are fixed to the arbors in that a hydraulic piston, adapted on the movable frame portion, force the sets against a fixed ring round the periphery in the end of the arbor. That will naturally cause, that the cooperating frame portions will be bent away from each other and the forces on the trust or thrust bearings, placed on the frame portion, will increase. The best way is preferably to keep the forces within the arbors in question.

Stated another way, different sets of cutters and spacers are affixed to the arbors in a manner so that when the arbors assume a certain position, the sets of cutters and spacers are forced against a fixed ring, which fixed ring is set around the periphery of an end of the arbor. The connecting assembly within the movable arbor contains a piston which presses a thrust ring toward the fixed ring. As a result, the portions of the frame will be forced away from each other and the forces on the thrust bearings will increase.

When slitting, where you carry out even numbers of cuts, the axial forces will be in balance. But by uneven cuts it will be forces, that are not in balance. In this situation, wherein there are uneven numbers of cuts, axial forces will increase in the thrust bearings of the arbors.

When slitting, the deflection of the arbors may not be allowed to be too big. In other words, the deflections of the arbors must be kept within certain tolerances during the slitting process. In that case, or the case when the deflection of the arbors exceeds the tolerances, the edges of the strips will not be sufficiently good or of sufficient quality, especially depending on that the plane surfaces of the cutters will be obliquely or obtusely angled in relation to each other. In other words, the edges of the strips may not be of an acceptable quality if the plane surfaces of the cutters are obliquely angled with respect to one another. That can also cause the edges to graze against each other, in which case, the edges will likely be damaged.

By common mounting of bearings on the arbors it is generally believed, that the arbors will be, from the bending point of view, freely fitted to the frame portions. If you were able to fit the arbors in the frame portions in that way that you could find them really fixed from the bending point of view, the bending of the arbors will decrease to one fifth.

To get an acceptable overlaying of the cutter edges between the over and under arbors, the distance between the respective cutter edges must be adjustable. The change of distance will be performed by moving one or both of the cooperating arbors vertically. Because of the resilience, it will be difficult to adjust the distance and also keep the correct distance between the respective arbors.

Surprisingly it has appeared a way to make a slitter for strips and for sheets, where you are successfully able to slit for instance stainless steel having a thickness of up to 15 mm, also foils of aluminum having a thickness down to 0.1 mm. The invention will be described more precisely in the enclosed claims.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention will be disclosed in more detail below with reference to the accompanying drawings, wherein.

DESCRIPTION OF THE PREFERRED EMBODIMENT

Figure 1:
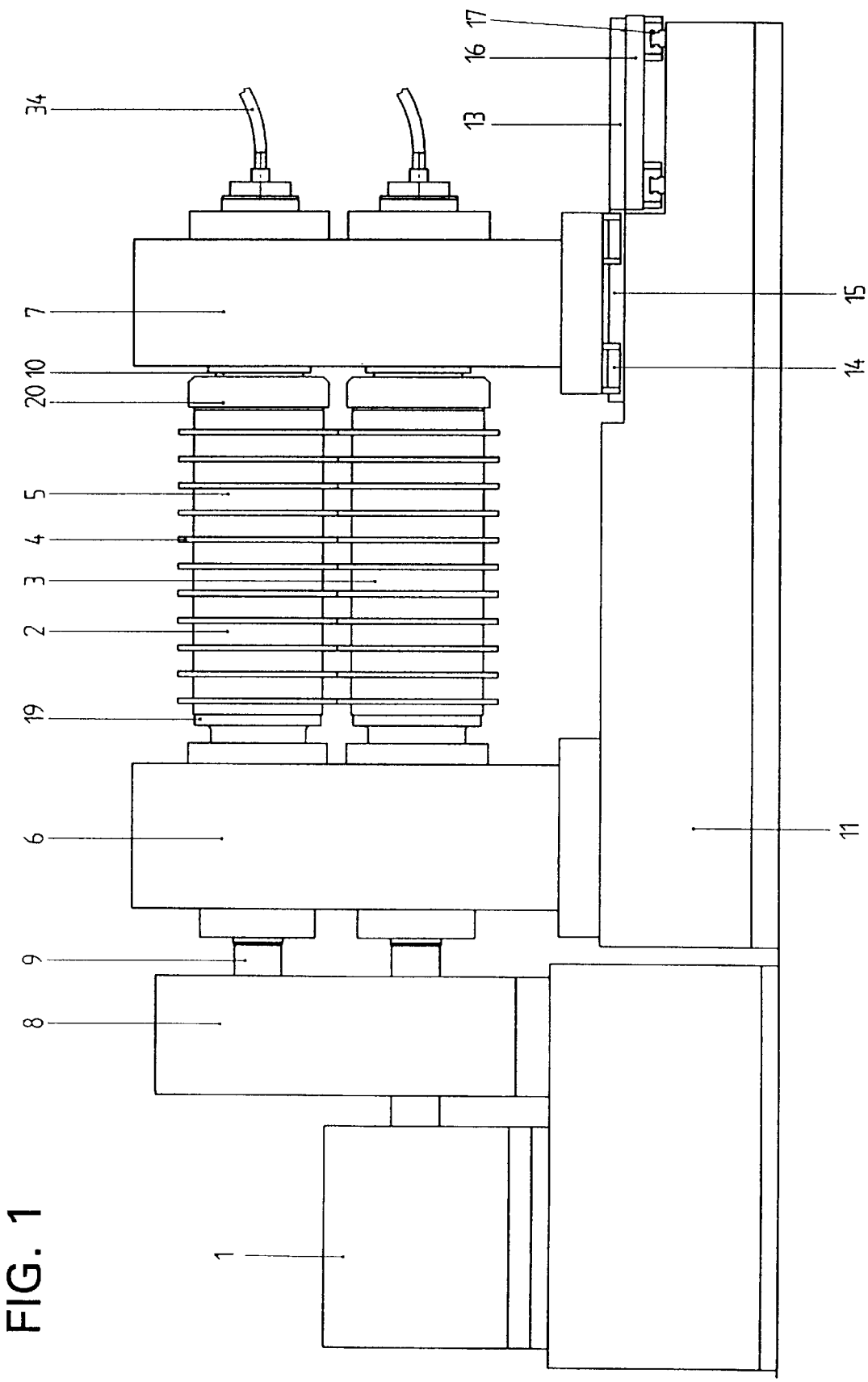
FIG. 1 is a side view of a slitter.

The slitter, as shown in FIG. 1, is used where slitting is executed between two arbors 2, 3. The arbors 2, 3 are equipped with cutters 4 and intermediate spacers 5. The width of the spacers 5 corresponds to the width of the desired strips.

The arbors 2, 3 are fixed in the ends to two frame portions 6, 7. The driving of these arbors 2, 3 is driven by driving means containing a driving unit 1, a gear reduction set 8 and two universal driving shafts or Schmidt-engagements 9 that are joined to the corresponding ends of the arbors 2, 3. The driving unit 1 may be an electric motor. In other words, the driving system for the arbors 2, 3 consists of the driving unit 1, connected to the gear reduction set 8, with the two universal driving shafts 9 connected to the ends of the arbors 2, 3. In one advantageous embodiment, in order to get an extremely good stability the two frame portions 6, 7 of the slitter can be joined together on the same base plate 11. One of the frame portions 6 will be quite stiffly or rigidly fixed or affixed to the base plate 11. The other frame portion 7 must be movable to expose the non driven end 10 of the arbors 2, 3. Doing so will make it relatively easy to change the sets of cutters 4 and spacers 5.

One movement is made in a direction parallel to the center line of the arbors 2, 3 to lay the ends of the arbors 2, 3 quite free. The following movement is made perpendicular to the previous movement. The movable frame portion 7 is placed on two parallel guide rolls 13 that in turn are fixed to the base plate 11. The two parallel roll guides or rail guides 13 shall be mounted parallel to the center lines of the arbors 2, 3 and in distance from each other. To get increased stability it will be very good to part or separate the roll guides 13 as much as possible. The top parts of the rail guides 13 are fixed to the under side of the frame portion 7. The play in the roll guides 13 and the friction is negligible. The top part 14 of the guide roll is namely parted from the bottom part 15 by spheres. The transverse movement is made in essentially the same way. After the front portion 7 has been moved away from its ordinary place or normal position to such an extent that the ends of the arbors 2, 3 are quite free, the front portion 7 has at the same time entered a sledge or sled 16, which sled 16 is movable perpendicular to the previous movement as far as it will be possible to dock a movable carriage to the ends of the arbors 2, 3. The sled 16 is in turn movable on rail guides 17 that are fixed to the bottom plate 11.

Usually the change of sets 4, 5 will be made by help of any kind of carriage. The carriage is moveable in the direction of the center lines of the arbors 2, 3. To the carriage is fixed a vertical, turning post. To this post are fixed in pairs above each other a number of arbors in different directions. When changing of sets 4, 5 these must get free from or clear the arbors 2, 3. The movable frame portion 7 is moved backwards and then sideways. The carriage is docked to the free ends 10 of the arbors 2, 3. The sets 4, 5 can then be pushed over to the carriage. Another pair of arbors, equipped with new sets 4, 5 are docked to the slitter and pushed onto the arbors 2, 3.

Figure 2:
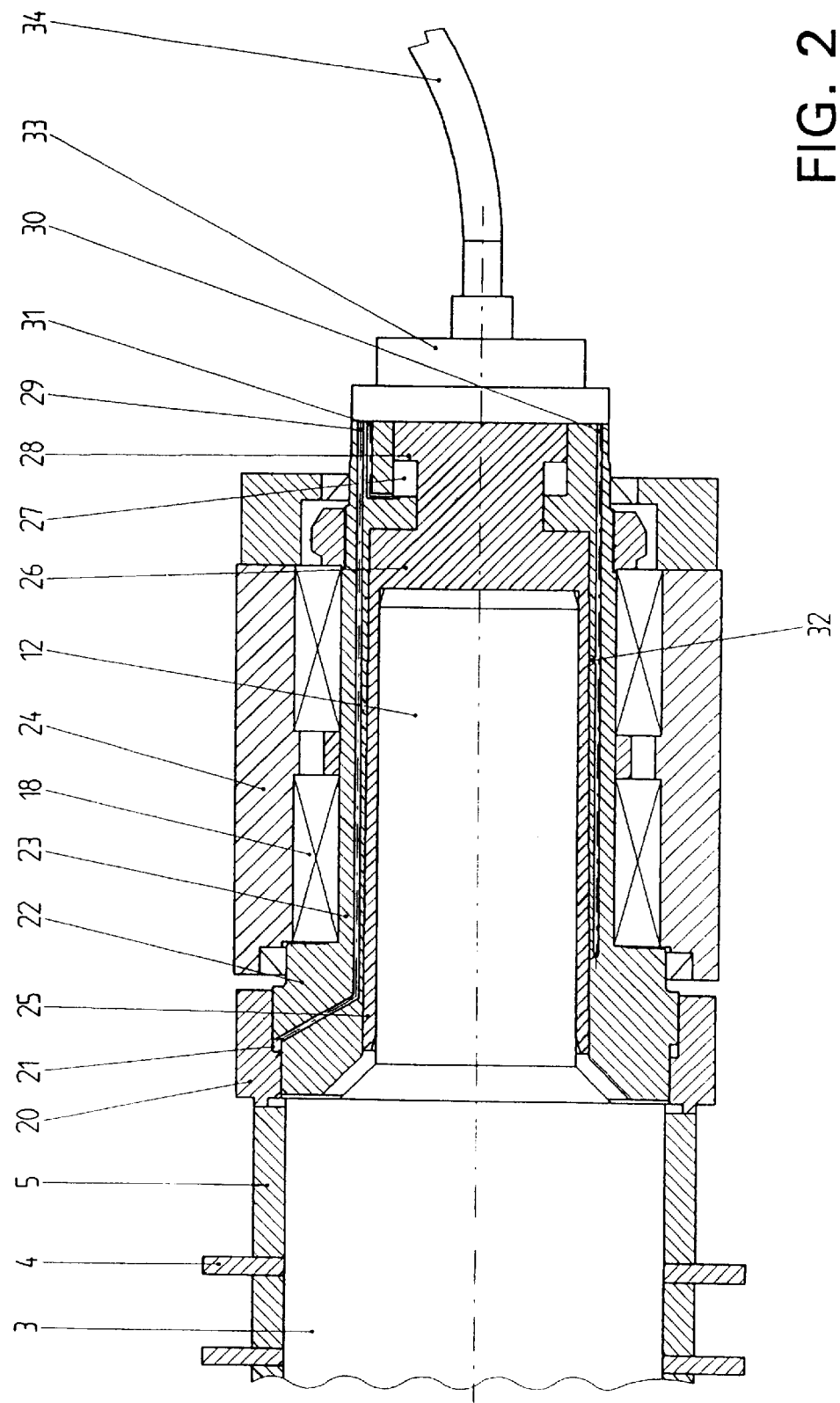
FIG. 2 is a longitudinal section through the bearing of the arbors fixed to the movable frame portion.

FIG. 2, described below, indicates greater detail of the connection between the arbors 2, 3 and the moveable frame portion.

Bringing the arbors 2, 3 together to the frame portions 6, 7 is aimed to get the play as small as possible both in radial and axial direction. The best way is to use paired bearings 18. The use of paired bearings 18 means that two or more roller bearings are especially selected and tested to work together very well and with small play. It will also be favorable to increase bending resistance of the arbors 2, 3, by hand clamping them to the bearing housings 24. That will be done by not allowing any bending inside the bearing housing 24. Practically it will be made by using at least two paired bearings 18 side by side. By extremely bad circumstances it is a favor to part them away a distance of at least one width of the used bearings 18. From this point of view and of other circumstances as will be shown below, the shafts 12 may be cylindrical.

In other words in case of extremely poor conditions, it is preferable to part or separate the bearings 18 by about one width of one of the bearings 18.

By providing pairs of bearings 18 on opposite sides of the shaft 12, which bearings are separated by a small space, the invention can provide a more stable arrangement with regard to motion transverse to the axial direction. In other words, the shaft will be less inclined to wobble around the axis.

The vertical position of at least one of the arbors 2, 3 must be adjustable to adjust for the overlapping of the edges. The bearing housings 24 of the adjustable arbors 2, 3 are guided by guides in the oblong windows of the frame portions 6, 7. Vertical rail guides are fitted to the vertical insides of the windows. The vertical position will continuously be adjusted by hydraulic jacks below the bearing housing 24. The hydraulic jacks get the hydraulic power from a servomotor, which servomotor is adjusted by a microcomputer, getting impulses from level indicators.

Figure 1A:
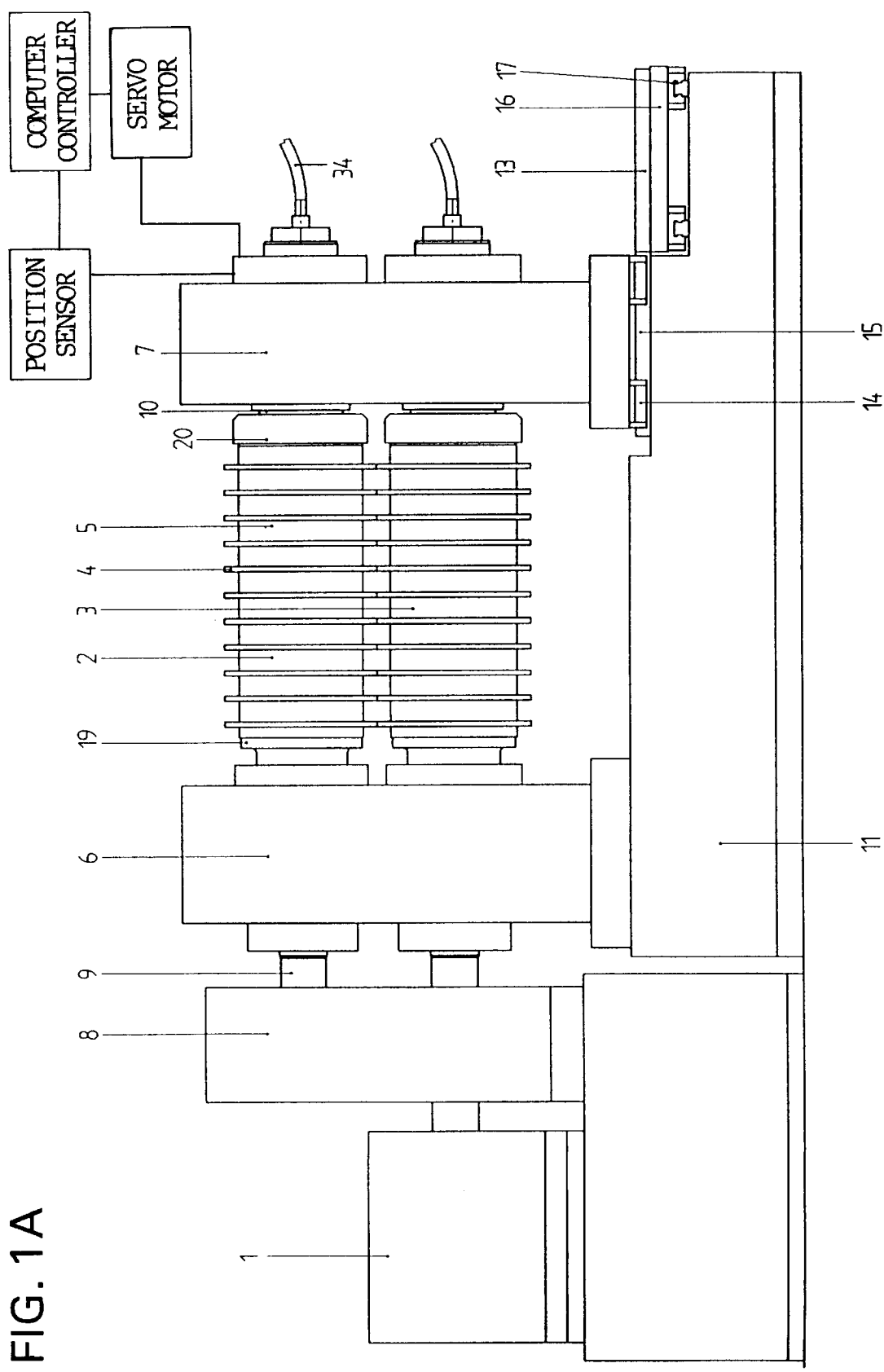
FIG. 1A shows additional detail of the view shown in FIG. 1.

FIG. 1A, depicts schematically a level indication system to track the position of the arbors 2, 3 relative to the bottom plate 11. Connected to the level indicator is a computer control system to process the information received from the level indication system. The computer control then connects to a servomotor, also shown schematically, which servomotor then adjusts the vertical position of the arbors 2, 3.

It is very important to make all parts of the slitter very stiff or firm or rigid. For this reason it is favorable to use rail guides mounted at the four vertical edges of the oblong window.

The set 4, 5 is fit to the arbor 2, 3, between a fixed ring 19 and a movable hydraulic trust or thrust ring 20. The fixed ring 19 is seated at the driving end 9 of the arbor 2, 3.

The thrust ring 20 is axially movable and is similar to the outer cylinder of a jack. The piston 21 of the jack is movable compared to or in relation to the thrust ring 20. The piston 21 is a part of a collar 22 on a moreover or substantially cylindric sleeve 23. The sleeve 23 is movable and located on a hollow arbor 25 on the shaft 12 of the arbor 2, 3.

The roller bearings 18 are fit to the mantle of the sleeve 23. The bearings 18 are joined to the movable frame portion 7 by bearing housings. A hollow arbor 25 is located between the sleeve 23 and the cylindrical shaft 12 of the arbor 2, 3. The hollow arbor 25 can be considered to be a sleeve with an end part 26 in the gable side. If the hollow arbor 25 is considered to be a sleeve, it can be considered to be a first sleeve with respect to the sleeve 23, which sleeve 23 can be considered to be a second sleeve. In this part 26 is located a hydraulic piston or hydraulic chamber 27. In the center of the hollow arbor 25 is a centric or central cavity. The bore diameter shall with slip fit match the diameter of the shaft 12. In other words, the bore diameter of the hollow arbor 25 fits snugly over the diameter of the shaft 12, this slip fit or snug fit is sufficiently tight to make it difficult to move the hollow arbor 25 by hand. In other words, the bore diameter is substantially the same as the diameter of the shaft 12, with just enough variance in diameters to allow a slip fit of the shaft 12 in the bore. The outer surface of the hollow arbor 25 is tapered to a smaller diameter in the end part 26. The inner surface of the sleeve 23 is adjusted to be in contact to the outer surface of the hollow arbor 25 but to also allow some pushing up on the hollow arbor 25. The pushing up of the sleeve 23 is limited to the piston stroke of the hydraulic piston 27 or of fixed lip. The pushing up movement will also initiate a force between the shaft 12 and the sleeve 23. The location of bearings 18 will also be at relatively the same place on the arbor 2, 3.

From the end part 26 of the hollow arbor 25 are drilled three holes 29, 30, 31 in axial directions. The first one 29 leads to the thrust ring 20. The first hole 29 is also connected to a spring-loaded accumulator (not shown) to prevent fall of pressure depending on leakage. The second hole 30 is connected to ring-shaped cut-in portions 32 in the inner surface of the piston 27 located at the end part 26 of the hollow arbor 25.

All three holes 29, 30, 31 are also separately connected to a turnable or rotatable or movable hydraulic oil connection 33. The hydraulic oil is led to this connection from a force pump (not shown) by a flexible tube 34.

In this way the clamping of the set 4,5 is kept within the arbor 2, 3 and essentially no influence on the axial bearing occurs.

Another advantage of this process to fix connect the arbors 2, 3 to the bearing housings 24 and to fix connect the bearing housings 24 to the frame portions 6, 7, is that it builds up a very stiff frame structure of the arbors 2, 3, the frame portion and the base plate 11.

In one embodiment of the present invention, the slitter is placed in operating position by applying hydraulic oil through the axial hole 29. The hydraulic oil then flows into the piston or hydraulic chamber 21 and forces the thrust ring 20 toward the fixed ring 19. This holds the cutters 4 and spacers 5 in the correct place. During operation, the hollow arbor 25 and the sleeve 23 are slip fit onto one another and held by pressure in the hydraulic piston or piston chamber 27. Due to the design of the end part 26 and the outer sleeve 23, the pressure in the piston chamber 27 pushes the outer sleeved 23 over the hollow arbor 25 and then pushes the assembly of outer sleeve 23 and hollow arbor 25 onto the cylindrical shaft 12.

It is advisable to make the change of the sets 4, 5 in the following way:

1. The hydraulic pressure to the thrust ring 20 (which is normally pressurized) is discharged to essentially zero.
2. The hydraulic pressure to the hydraulic piston 27 is increased a little to block the sleeve 23 up on the shaft 12.
3. The hydraulic pressure is increased to the cut-in portions 32 to get an oil film between the hollow arbor 25 and the sleeve 23.
4. The pressure in the hydraulic piston 27 is gradually reduced until the sleeve 23 is loose from the hollow arbor 25. The hydraulic pressure to the oil connection 33 is unloaded.

The movable frame portion 7 is now free to be moved backward and sideways. The sets 4, 5 are now also free to be moved backward and away from the arbors 2, 3.

New sets 4, 5 can now be pushed onto the arbors 2, 3.

Stated another way, the method of disassembly involves first discharging the hydraulic pressure to the piston 21 to release the pressure on the thrust ring 20. Following this release of pressure, the pressure to the piston chamber 27, is increased slightly, by increasing the supply of hydraulic oil to the piston 27 through the hole or passage 31. This application of pressure will force the sleeve 23 to move toward the arbors 2, 3.

Following the pressurization of the piston 27, additional hydraulic oil can also be supplied through the hole 30 to the cut-in portions 32. Hydraulic oil supplied to the cut-in portions 32 will then go through the cut-in portion 32 to form a thin film between the hollow arbor 25 and the sleeve 23. This can allow the hollow arbor 25 and the sleeve 23 to be movable with respect to one another. In other words, the integrity of the slip fit between the hollow arbor 25 and the sleeve 23 will be decreased.

Once this slip fit has been weakened, the hydraulic oil supply to the piston 27 can be decreased, until the sleeve 23 becomes loose or free with respect to the hollow arbor 25. At this time, the movable frame portion 7 can be moved away from the arbors 2, 3 and the cutters 4 and spacers 5 can be changed.

The reassembly of the slitting devise can proceed as follows:

5. The movable frame portion 7 is turned and put in position.
6. The hydraulic pressure is increased in the cut-in portions 32. An oil film will diverge between the hollow arbor 25 and the sleeve 23.
7. The hydraulic pressure is increased in the hydraulic piston 27 and the sleeve 23 is moved onto the hollow arbor 25.
8. The hydraulic pressure to the cut-in portions 32 will be unloaded. Now a stiff clamping will be obtained between the sleeve 23 the hollow arbor 25 and the shaft 12.

In other words, the reassembly of the slitter involves, first, returning the movable frame portion 7 to the operating position. After this, hydraulic pressure is applied, through hole 30, to the cut-in portions 32. This again allows an oil film to form between the hollow arbor 25 and the sleeve 23. At this time, hydraulic pressure is again applied to the piston chamber 27. By applying pressure to this piston 27, a force is applied to the hollow arbor 25 and a force in the opposite direction is applied to the sleeve 23. This again force fits the hollow arbor 25 and the sleeve 23 together.

Subsequent to the sleeve 23 and hollow arbor 25 being forced together, hydraulic pressure is released to the cut-in portions 32. This allows the oil film formed between the sleeve 23 and the hollow arbor 25 to be forced out back through the cut-in portion 32 and helps to secure the fit between the sleeve 23 and the hollow arbor 25. At this point, the sleeve 23, the hollow arbor 25 and the cylindrical shaft 12 will be securely held together. Hydraulic oil can again be applied to the piston 21 to secure the thrust ring 20 and the slitter can return to normal operation.

In one embodiment of the present invention, once the fit between the sleeve 23 and the hollow arbor 25 has been secured, the sleeve 23 and hollow arbor 25 are fixed not only with respect to one another, but also with respect to the cylindrical shaft 12. In other words, the slip fit connects not only the hollow arbor 25 and sleeve 23, but also the shaft 12. This solid connection between the sleeve 23, the hollow arbor 25 and the shaft 12, minimizes forces applied in the axial direction. This then means that a minimal axial force, if any, will be applied to the bearings 18 and the bearing housings 24 where they connect to the movable frame portion 7.

Similarly, during the removal process described above, the release of the slip fit between the sleeve 23 and the hollow arbor 25, also allow them to move relative to the cylindrical shaft 12.

Following these steps, it is now possible to restart a slitting operation.

All these above mentioned movements can be executed from a central control panel or by a computer.

One feature of the invention resides broadly in the slitter for strips, comprising two frame portions 6, 7 two parallel arbors 2, 3 extending between the frame portions 6, 7, one of the frame portions 6 comprising driving means 1 for rotating the arbors 2, 3 the opposite frame portion 7 being movable to permit sets 4, 5 of cutters 4 and spacers 5 to be assembled and disassembled on each arbor 2, 3 characterized in that a hollow arbor 25, whose outside diameter is a little tapered, is with slip fit pushed onto the cylindrical shaft 12 of the arbor 2, 3 a sleeve 23 fit with a collar 22, on the outside diameter have bearings for joining the arbors 2, 3 to the movable frame portion 7 and whose inner surface has the same tapering as the outer surface of the hollow arbor 25 and by pressing it onto the hollow arbor 25 will clamp it and at the same time clamp the hollow arbor 25 with he shaft 12 of the arbor 2, 3 and a movable hydraulic thrust ring 20, is fit to the collar 22 for pressing the sets 4, 5 of cutters 4 and spacers 5 together between this thrust ring 20 and a fixed ring 19 on the opposite side of the arbor 2, 3.

Another feature of the invention resides broadly in the slitter characterized in that a hydraulic piston 27 is centrally fit to the end part 26 of the hollow arbor 25 and with hydraulic pressure is able to move the sleeve 23 onto the hollow arbor 25.

Yet another feature of the invention resides broadly in the a slitter characterized in that joining of the arbors 2, 3 to the frame portions 7 is made by help of at least two paired bearings 18 side by side.

Still another feature of the invention resides broadly in the slitter characterized in that the distance between the bearings 18 is at least the axial width of the bearings 18.

A further feature of the invention resides broadly in the slitter characterized in that the movable frame portion 7 is pushed away from the end shafts 12 of the arbors 2, 3 on at least two horizontal rail guides 13.

Another feature of the invention resides broadly in the slitter characterized in that the movable frame portion 7 is pushed sideways on other horizontal rail guides 17 after that the frame portion has been moved quite away from the ends of arbors 2, 3.

Yet another feature of the invention resides broadly in the a slitter characterized in that the bearing housings 24 on the arbors 2, 3 are guided up and down by vertical guide rails, fit to the two vertical opposite surfaces inside the frame portions 6, 7 near the vertical edges of the surfaces.

Still another feature of the invention resides broadly in the slitter characterized in that the vertical position of the arbors 2, 3 are continuously adjusted by hydraulic jacks.

A further feature of the invention besides broadly in the slitter characterized in that the hydraulic jack gets power from a microcomputer adjustable servomotor that gets impulses from level indicators.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Swedish Patent Application No. 9600098-9, filed on Jul. 12, 1996, having inventors Stig Söderlund and Jan Rönngren, and Swedish Patent Application No. 9601839-5, filed on May 13, 1996, and European Patent Application No. EP 97850001.5, filed on Jan. 9, 1997, as well as their published equivalents, and other equivalents or corresponding applications, if any, in corresponding cases in Sweden and elsewhere, and the references cited in any of the documents cited herein, are hereby incorporated by reference as if set forth in their entirety herein.

Examples of arbors which may be used in embodiments of the present invention may be found in the following U.S. Pat. Nos: 5,383,263; 5,406,870; 5,427,482; 5,429,457; and 5,447,397.

Examples of devices for cutting metal strips which may be used in conjunction with embodiments of the present invention may be found in the following U.S. Pat. Nos.: 5,406,865; and 5,433,563.

Examples of metal cutting blades which may be used in conjunction with embodiments of the present invention may be found in the following U.S. Pat. Nos.: 5,381,342; 5,384,957; 5,402,693; 5,413,521; 5,417,132; 5,425,259; 5,438,819; and 5,464,64.

Examples of metal strips and devices for making metal strips which may be used with embodiments of the present invention, may be found in the following U.S. Pat. Nos.: 5,379,829; 5,380,378; 5,381,342; 5,390,726; 5,394,722; 5,399,060; 5,409,653; 5,421,535; 5,425,259; 5,435,164; 5,437,089; 5,445,212; 5,447,802; 5,456,308; 5,461,770; 5,462,109; 5,468,914; 5,472,515; and 5,472,528.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A slitter for cutting strips of coils, said slitter comprising:

a frame;

said frame comprising two portions;

said two frame portions being substantially parallel to one another;

a first arbor and a second arbor;

two cutter sets, one of said two cutter sets being disposed about said first arbor, and the other of said two cutter sets being disposed about said second arbor;

each of said two cutter sets comprising:
 at least one cutter; and
 at least one spacer;

said first and second arbors being disposed between said two frame portions, substantially transverse to said two frame portions;

a drive to rotate said first and second arbors;

said drive being disposed adjacent to one of said two frame portions;

the other of said two frame portions being movable with respect to said first and second arbors;

said first and second arbors each having first and second ends;

said first and second arbors each comprising a cylindrical shaft disposed at said first end of each of said first and second arbors;

said first and second arbors each comprising a fixed ring disposed at said second end of each of said first and second arbors;

at least one assembly to connect one of said first and second arbors to said movable frame portion;

said at least one connecting assembly comprising:
 a bearing assembly to connect said one of said first and second arbors to said movable frame portion;
 a first sleeve having a first end portion and a second end portion;
 said first sleeve having an outside diameter;
 the outside diameter of said first sleeve being greater at a given point on said first end portion of said first sleeve than at a given point on said second end portion of said first sleeve to form a tapered outer surface from the given point on said first end portion to the given point on said second end portion;
 said first sleeve for being disposed about said cylindrical shaft of one of said first and second arbors;
 said first end portion of said first sleeve being disposed adjacent to said one of said first and second arbors;
 a second sleeve having a first end portion and a second end portion;
 said second sleeve being disposed concentrically about said first sleeve and at least substantially overlapping said first sleeve;
 said second sleeve having an inside diameter;
 the inside diameter of said second sleeve being greater at a given point on said first end portion than at a given point on said second end portion to form a tapered inner surface from the given point on said first end portion to the given point on said second end portion;
 the inside diameter at the given point on said second sleeve at said first end portion of said second sleeve being substantially equal to the outside diameter at the given point of said first sleeve at said first end portion of said first sleeve and the inside diameter at the given point on said second sleeve at said second end portion of said second sleeve being substantially equal to the outside diameter at the given point on said first sleeve at said second end portion of said first sleeve to permit said second sleeve to be clamped onto said first sleeve and to permit said second sleeve to be released from said first sleeve;

a collar disposed about said first end portion of said second sleeve;
 a thrust ring disposed adjacent to said collar; and
 said thrust ring being disposed and configured to tension said cutter set between said thrust ring and said fixed ring.

2. The slitter according to claim 1 wherein:

said at least one connecting assembly comprises two connecting assemblies;

one of said connecting assemblies being disposed on said first arbor to connect said first arbor to said movable frame portion; and the other of said connecting assemblies being disposed on said second arbor to connect said second arbor to said movable frame portion.

3. The slitter according to claim 2 wherein:

said first sleeve of each of said two connecting assemblies comprises an end part;

said end part being disposed adjacent said second end portion of said first sleeve; and said end part being disposed adjacent to said cylindrical shaft.

4. The slitter according to claim 3 wherein:

each of said two connecting assemblies comprises a hydraulic piston;

said hydraulic piston is disposed adjacent to said end part of said first sleeve; and said hydraulic piston is disposed and configured to bias said second sleeve onto said first sleeve.

5. The slitter according to claim 4 wherein:

said bearing assembly comprises at least two bearings to connect said one of said first and second arbors to said movable frame portion; and said at least two bearings are disposed adjacent one another.

6. The slitter according to claim 5 wherein:

said at least two bearings have substantially the same dimensions;

said at least two bearings have a length substantially parallel to said first and second arbors;

said at least two bearings have a width substantially transverse to said length;

said at least two bearings are disposed a distance from one another; and said distance between said at least two bearings is substantially greater than or equal to the width of said at least two bearings.

7. The slitter according to claim 6 comprising:

a base plate; and said at least two frame portions being disposed on said base plate, substantially transverse to said case plate.

8. The slitter according to claim 7 comprising:

at least two rails;

said at least two rails being disposed on said base plate;

said at least two rails being substantially parallel to said first and second arbors; and said movable frame portion being disposed and configured to be movable on said at least two rails, to move said movable frame portion away from said first and second arbors.

9. The slitter according to claim 8 comprising:

at least two additional rails;

said at least two additional rails being disposed on said base plate;

said at least two additional rails being substantially transverse to said at least two rails; and said movable frame portion being disposed and configured to be movable on said at least two additional rails, upon movement of said movable frame portion away from said first and second arbors on said at least two rails.

10. The slitter according to claim 9 wherein said two connecting assemblies each comprise a bearing housing disposed about said at least two bearings.

11. The slitter according to claim 10 wherein said cylindrical shaft of each of said first and second arbors comprises:

a cylindrical portion;

said cylindrical portion having an outer diameter;

a tapered end;

said tapered end being disposed adjacent said end part;

said tapered end having an outer diameter; and the outer diameter of said tapered end being smaller than the outer diameter of said cylindrical portion.

12. The slitter according to claim 11 comprising:

two hydraulic tubes;

one of said two hydraulic tubes being disposed to provide hydraulic fluid to one of said first and second arbors; and the other one of said two hydraulic tubes being disposed to provide hydraulic fluid to the other of slid first and second arbors.

13. The slitter according to claim 12 wherein said end part of each of said two connecting assemblies comprises at least three holes therethrough for the passage of hydraulic fluid therethrough.

14. The slitter according to claim 13 wherein said second sleeve of each of said two connecting assemblies comprises a passage therethrough to allow passage of hydraulic fluid therethrough.

15. The slitter according to claim 14 comprising:

a gear reduction set;

said gear reduction set being disposed between said drive and said first and second arbors; and said gear reduction set being configured to transfer torque from said drive to said first and second arbors.

16. The slitter according to claim 15 comprising:

a sled;

said sled being disposed on said two additional rails; and said movable frame portion being configured to be disposed on said sled upon movement of said movable frame portion on said two rails to thus be movable along said two additional rails.

17. The slitter according to claim 16, comprising:

at least one hydraulic jack disposed in each of said two frame portions; and said at least one hydraulic jack being disposed to adjust the position of said first and second arbors relative to said base plate.

18. The slitter according to claim 17 comprising:

at least one servomotor; and said at least one servomotor being disposed to provide power to said at least one hydraulic jack to adjust the position of said first and second arbors with respect to said base plate.

19. The slitter according to claim 18 comprising:

a microcomputer to control said at least one servomotor; and at least one level indicator to provide the position of said first and second arbors relative to said base plate to said microcomputer.

* * * * *